(12) United States Patent
Okabe

(10) Patent No.: US 9,358,839 B2
(45) Date of Patent: Jun. 7, 2016

(54) HEAVY DUTY PNEUMATIC TIRE

(71) Applicant: Sumitomo Rubber Industries Ltd., Kobe-shi (JP)

(72) Inventor: Taro Okabe, Kobe (JP)

(73) Assignee: SUMITOMO RUBBER INDUSTRIES LTD., Kobe-shi (JP)

( * ) Notice: Subject to any disclaimer, the term of this patent is extended or adjusted under 35 U.S.C. 154(b) by 609 days.

(21) Appl. No.: 13/777,604

(22) Filed: Feb. 26, 2013

(65) Prior Publication Data

US 2013/0220500 A1     Aug. 29, 2013

(30) Foreign Application Priority Data

Feb. 27, 2012   (JP) .................................. 2012-040676

(51) Int. Cl.
*B60C 1/00*         (2006.01)
*B60C 11/00*        (2006.01)
*B60C 11/03*        (2006.01)

(52) U.S. Cl.
CPC ........... *B60C 11/0306* (2013.04); *B60C 1/0016* (2013.04); *B60C 11/0058* (2013.04); *B60C 2011/0025* (2013.04); *B60C 2011/0033* (2013.04); *B60C 2200/06* (2013.04)

(58) Field of Classification Search
CPC .. B60C 1/0016; B60C 11/00; B60C 11/0008; B60C 11/0041; B60C 11/0058; B60C 11/0066
See application file for complete search history.

(56) References Cited

FOREIGN PATENT DOCUMENTS

| AT | 376401 | * | 11/1984 |
|---|---|---|---|
| EP | 839675 | * | 5/1998 |
| FR | 2303675 | * | 10/1976 |
| JP | 56-128203 | * | 10/1981 |
| JP | 60-61312 | * | 4/1985 |
| JP | 62059105 | * | 3/1987 |
| JP | 1-212602 | * | 8/1989 |
| JP | 06040213 | * | 2/1994 |
| JP | 7-32817 | * | 2/1995 |
| JP | 2001-47815 | * | 2/2001 |
| JP | 2005-199922 | * | 7/2005 |
| JP | 2007-182099 |   | 7/2007 |

OTHER PUBLICATIONS

Machine translation of JP 7-32817, 1995.*

* cited by examiner

*Primary Examiner* — Justin Fischer
(74) *Attorney, Agent, or Firm* — Oblon, McClelland, Maier & Neustadt, L.L.P

(57) ABSTRACT

A heavy duty pneumatic tire has a belt and a tread such that ratio of width of the belt to width of the tread is greater than or equal to 0.95 and is not greater than 1.0. The tread has shoulder land portions on outer sides in axial direction, each shoulder portion has a cap layer including a body portion and a pad, the pad has complex elastic modulus greater than complex elastic modulus of the body portion, the body portion has loss tangent less than loss tangent of the pad, and each shoulder portion has ground-contact surface which has outer and inner ground-contact surfaces separated by boundary between the body portion and pad such that ratio of average ground-contact pressure of the outer ground-contact surface relative to average ground-contact pressure of the inner ground contact surface is greater than or equal to 0.85 and is not greater than 0.95.

20 Claims, 7 Drawing Sheets

HEAVY DUTY PNEUMATIC TIRE

CROSS-REFERENCE TO RELATED APPLICATIONS

The present application is based upon and claims the benefit of priority from Japanese Application No. 2012-040676, filed Feb. 27, 2012, the entire contents of which are incorporated herein by reference.

BACKGROUND OF THE INVENTION

1. Field of the Invention

The present invention relates to heavy duty pneumatic tires.

2. Description of the Background Art

In the tread of the tire, uneven wear is likely to occur in the land portions (hereinafter, referred to as shoulder land portions) positioned on the outer sides in the axial direction. This tendency is significant particularly in a tire mounted to a steered wheel (front wheel) of a vehicle.

The shoulder land portion of the tread may become worn so as to gradually reduce its thickness from the inner side toward the outer side in the axial direction. Such wear is referred to as shoulder wear.

In Japanese Laid-Open Patent Publication No. 2007-182099, the shoulder land portion is formed of blocks aligned with each other in the circumferential direction. In the tire, change of ground-contact shapes of the blocks due to an applied load being changed is restrained by the lengths of the blocks in the circumferential direction being adjusted. The entire contents of Japanese Laid-Open Patent Publication No. 2007-182099 are incorporated herein by reference.

SUMMARY OF THE INVENTION

According to one aspect of the present invention, a heavy duty pneumatic tire includes a tread formed of a crosslinked rubber and having an outer surface forming a tread surface, and a belt positioned inward of the tread in a radial direction such that the ratio of the width of the belt to the width of the tread is greater than or equal to 0.95 and is not greater than 1.0. The tread has a base layer and a cap layer formed outward of the base layer in the radial direction, the tread has main grooves extending in a circumferential direction and land portions aligned with each other in an axial direction, the land portions include shoulder land portions positioned on outer sides in the axial direction, the cap layer has a body portion and a pad, the pad is joined to a cut portion of the body portion formed in an outer side portion in the axial direction, the ratio of the thickness of the pad to the thickness of each of the shoulder land portions is greater than or equal to 0.30 and is not greater than 0.35, the ratio of the width of the pad to the width of each of the shoulder land portions is greater than or equal to 0.30 and is not greater than 0.60, the body portion has a complex elastic modulus which is greater than or equal to 4.95 MPa and is not greater than 5.45 MPa, the pad has a complex elastic modulus which is greater than the complex elastic modulus of the body portion, the pad has a loss tangent which is greater than or equal to 0.108 and is not greater than 0.122, the body portion has a loss tangent which is less than the loss tangent of the pad, each of the shoulder land portions has a ground-contact surface in a state where the tire is in contact with ground, and the ground-contact surface of each of the shoulder land portions has an outer ground-contact surface and an inner ground-contact surface positioned inward of the outer ground-contact surface in the axial direction and separated by the boundary between the body portion and the pad such that the ratio of the average ground-contact pressure of the outer ground-contact surface relative to the average ground-contact pressure of the inner ground contact surface is greater than or equal to 0.85 and is not greater than 0.95.

According to another aspect of the present invention, a heavy duty pneumatic tire includes a belt, and a tread formed of a crosslinked rubber and formed on the belt such that the ratio of the width of the belt to the width of the tread is greater than or equal to 0.95 and is not greater than 1.0. The tread has shoulder land portions positioned on outer sides in an axial direction, each of the shoulder land portions has a cap layer and is formed such that the cap layer has a body portion having a cut portion in an outer side portion in the axial direction and a pad formed in the cut portion of the body portion, the pad has a complex elastic modulus which is greater than a complex elastic modulus of the body portion, the body portion has a loss tangent which is less than a loss tangent of the pad, and each of the shoulder land portions has a ground-contact surface having an outer ground-contact surface and an inner ground-contact surface positioned inward of the outer ground-contact surface in the axial direction and separated by the boundary between the body portion and the pad such that the ratio of the average ground-contact pressure of the outer ground-contact surface relative to the average ground-contact pressure of the inner ground contact surface is greater than or equal to 0.85, and is not greater than 0.95.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
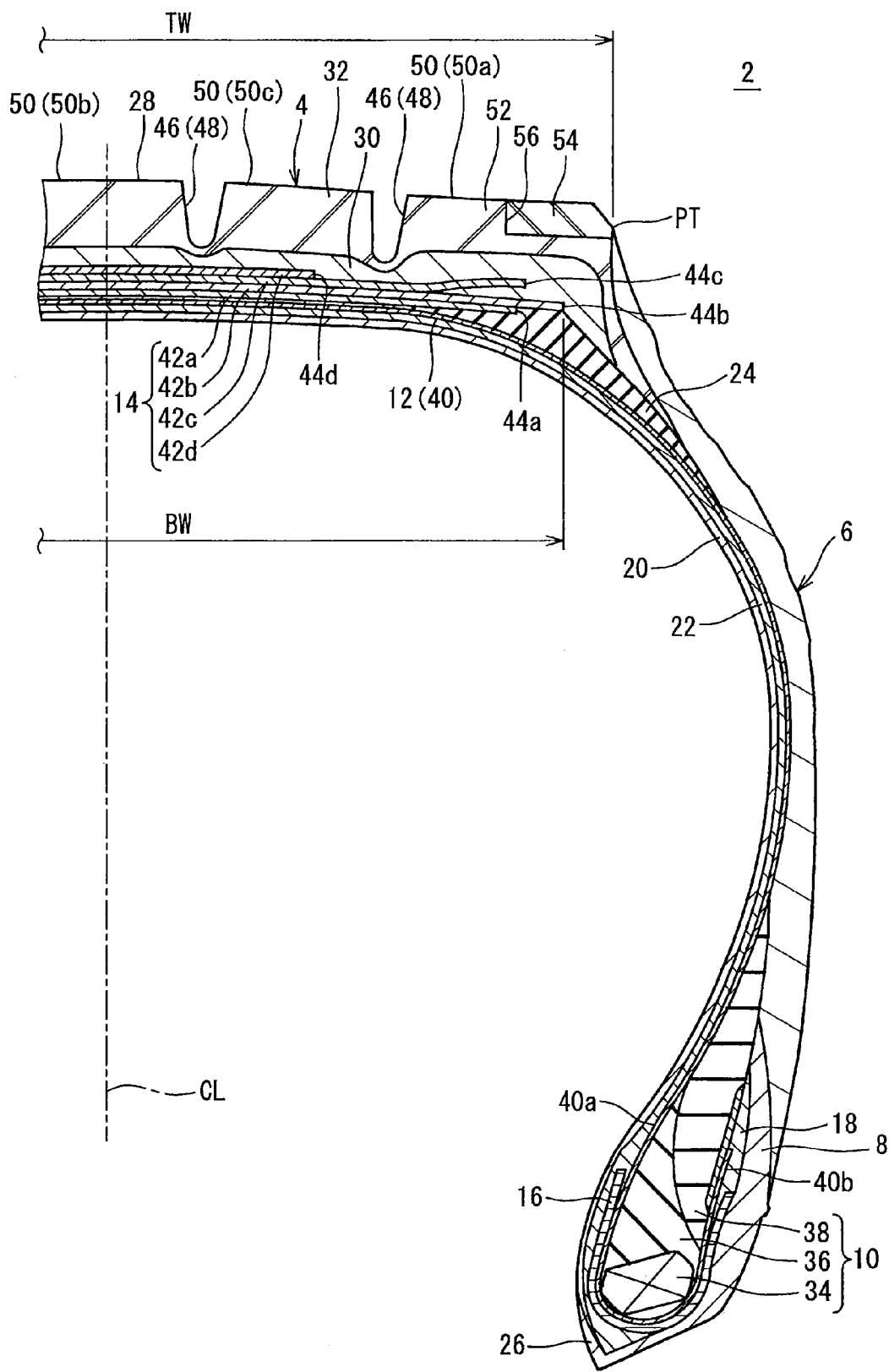
FIG. 1 is a cross-sectional view of a portion of a heavy duty pneumatic tire according to one embodiment of the present invention.

The embodiments will now be described with reference to the accompanying drawings, wherein like reference numerals designate corresponding or identical elements throughout the various drawings.

Figure 2:
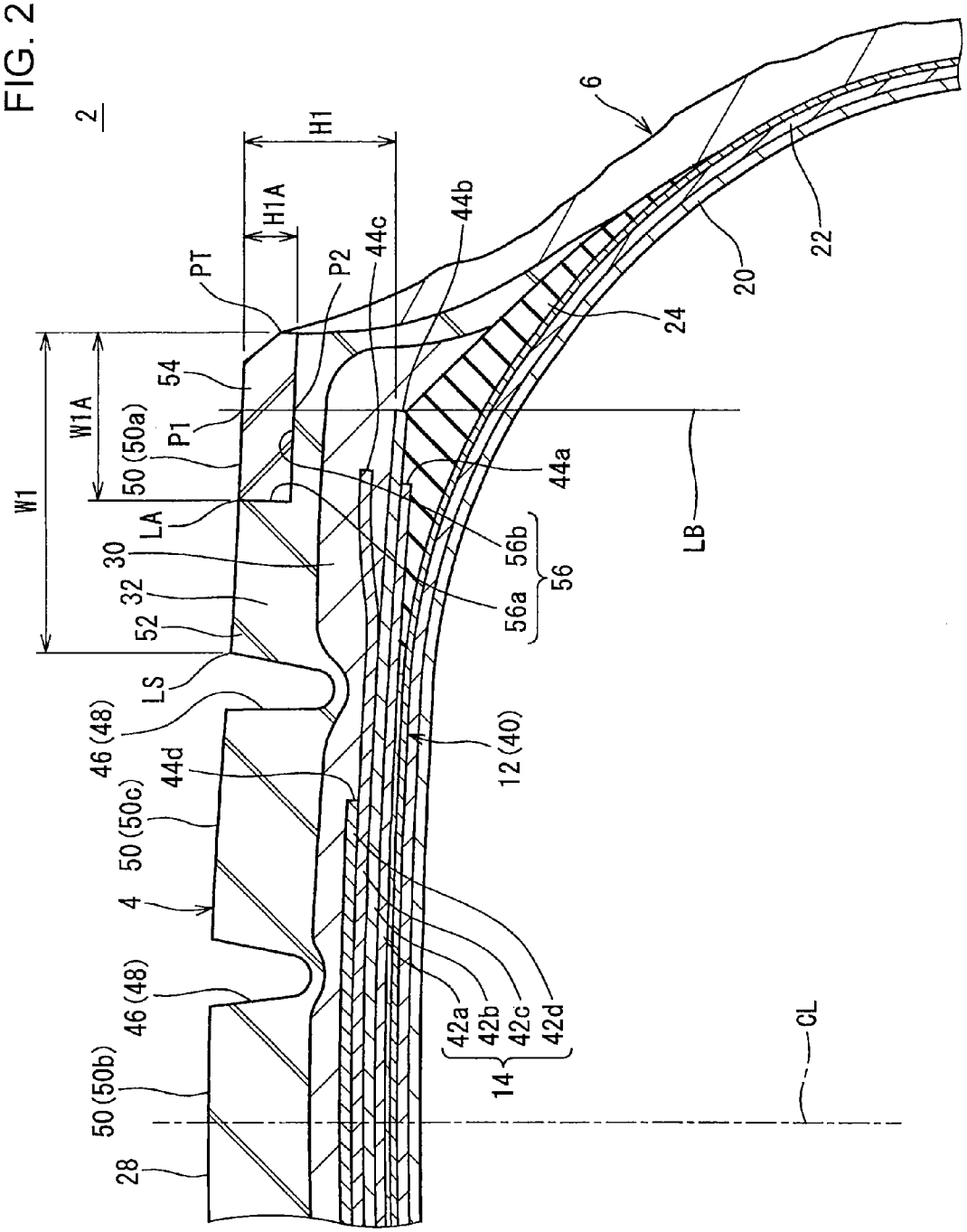
FIG. 2 is a development of a portion of a tread pattern of the tire shown in FIG. 1.

FIG. 1 and FIG. 2 show a pneumatic tire 2. In FIGS. 1 and 2, the upward/downward direction represents the radial direction of the tire 2, the leftward/rightward direction represents the axial direction of the tire 2, and the direction orthogonal to the surface of the sheet represents the circumferential direction of the tire 2. In the drawings, an alternate long and short dash line "CL" represents the equator plane of the tire 2. The tire 2 has a shape that is symmetric about the equator plane except a tread pattern. FIG. 2 is a partially enlarged view of the tire 2 shown in FIG. 1.

The tire 2 includes a tread 4, sidewalls 6, clinches 8, beads 10, a carcass 12, a belt 14, reinforcing layers 16, cover rubbers 18, an inner liner 20, an insulation 22, cushion layers 24, and chafers 26. The tire 2 is of a tubeless type. The tire 2 is mounted to trucks, buses, and the like. The tire 2 is a heavy duty pneumatic tire.

The tread 4 has a shape projecting outward in the radial direction. The tread 4 is formed of a crosslinked rubber. The tread 4 forms a tread surface 28 that can contact with a road surface. In the drawings, Reference Character "PT" represents an end of the tread 4. The end (PT) is a boundary between the tread 4 and each sidewall 6 on the outer surface of the tire 2.

The tread 4 includes a base layer 30 and a cap layer 32. The cap layer 32 is disposed outward of the base layer 30 in the radial direction. The cap layer 32 is layered over the base layer 30. In general, the base layer 30 is formed of a crosslinked rubber excellent in adhesion. A base rubber of the base layer 30 is typically a natural rubber. In general, the cap layer 32 is formed of a crosslinked rubber excellent in wear resistance, heat resistance, and grip performance.

Each sidewall 6 extends from the end (PT) of the tread 4 almost inward in the radial direction. Outer side ends, in the radial direction, of the sidewalls 6 are joined to the tread 4. Inner side ends, in the radial direction, of the sidewalls 6 are joined to the clinches 8, respectively. The sidewalls 6 are formed of a crosslinked rubber excellent in cut-resistance and light resistance. The sidewalls 6 prevent the carcass 12 from being damaged.

The clinches 8 are disposed almost inward of the sidewalls 6 in the radial direction. The clinches 8 are disposed outward of the beads 10 and the carcass 12 in the axial direction. The clinches 8 abut against flanges of a rim (not shown). The clinches 8 are formed of a crosslinked rubber excellent in wear resistance.

The beads 10 are disposed inward of the sidewalls 6 in the radial direction. Each bead 10 includes a core 34, an apex 36 that extends from the core 34 outward in the radial direction, and a packing rubber 38 that extends from the apex 36 outward in the radial direction. The core 34 is ring-shaped, and includes a non-stretchable wound wire. A material of the wire is typically a steel. The apex 36 is tapered outward in the radial direction. The apex 36 is formed of a crosslinked rubber having a high hardness. The packing rubber 38 is tapered outward in the radial direction. The packing rubber 38 is soft. The packing rubber 38 alleviates concentration of a stress on each end of the carcass 12.

The carcass 12 is formed as a carcass ply 40. The carcass ply 40 extends on and between the beads 10 on both sides along the inner sides of the tread 4 and sidewalls 6. The carcass ply 40 is turned up around each core 34 from the inner side toward the outer side in the axial direction. The carcass ply 40 includes a main portion (40a) and turned-up portions (40b) due to the carcass ply 40 being turned up. The end of each turned-up portion (40b) is disposed outward, in the axial direction, of the packing rubber 38 that forms a portion of the bead 10.

The carcass ply 40 is formed of multiple cords aligned with each other and a topping rubber, which is not shown. An absolute value of an angle of each cord relative to the equator plane ranges from 45° to 90°, and more preferably ranges from 75° to 90°. In other words, the carcass 12 forms a radial structure. Each cord is formed of a steel. The carcass 12 may be formed of two or more carcass plies 40.

The belt 14 extends in the axial direction. The belt 14 is disposed inward of the tread 4 in the radial direction. The belt 14 is disposed outward of the carcass 12 in the radial direction. The belt 14 reinforces the carcass 12. In the tire 2, the belt 14 includes a first layer (42a), a second layer (42b), a third layer (42c), and a fourth layer (42d).

In the tire 2, an end (44b) of the second layer (42b) is disposed outward of an end (44a) of the first layer (42a) in the axial direction. The end (44b) of the second layer (42b) is disposed outward of an end (44c) of the third layer (42c) in the axial direction. The end (44b) of the second layer (42b) is disposed outward of an end (44d) of the fourth layer (42d) in the axial direction. In the tire 2, the second layer (42b) has a greatest width among the first layer (42a), the second layer (42b), the third layer (42c), and the fourth layer (42d) of the belt 14. In the tire 2, each end (44b) of the second layer (42b) represents ends of the belt 14.

The first layer (42a), the second layer (42b), the third layer (42c), and the fourth layer (42d) are each formed of multiple cords aligned with each other and a topping rubber, which is not shown. Each cord is formed of a steel. Each cord is diagonal relative to the equator plane. An absolute value of an angle of each cord relative to the equator plane ranges from 15° to 70°.

The reinforcing layers 16 are wound around the cores 34, respectively. The reinforcing layers 16 are layered over the carcass ply 40. Each reinforcing layer 16 is formed of multiple cords aligned with each other and a topping rubber. Each cord is formed of a steel. The reinforcing layer 16 may be referred to as a steel filler. The reinforcing layers 16 can contribute to durability of the tire 2.

The cover rubbers 18 are disposed outward of the packing rubbers 38, respectively, in the axial direction. The cover rubbers 18 cover the ends of the turned-up portions (40b), respectively, of the carcass ply 40 as shown in FIG. 1. The cover rubbers 18 can alleviate concentration of a stress on the ends of the turned-up portions (40b).

The inner liner 20 forms an inner surface of the tire 2. The inner liner 20 is formed of a crosslinked rubber. A rubber excellent in air blocking performance is used for the inner liner 20. A base rubber of the inner liner 20 is typically a butyl rubber or a halogenated butyl rubber. The inner liner 20 maintains an internal pressure of the tire 2.

The insulation 22 is disposed outward of the inner liner 20. The insulation 22 is disposed inward of the carcass 12. The insulation 22 is disposed between the carcass 12 and the inner liner 20. The insulation 22 is formed of a crosslinked rubber excellent in adhesion. The insulation 22 is firmly joined to the carcass 12, and is also firmly joined to the inner liner 20. The insulation 22 restrains separation of the inner liner 20 from the carcass 12.

The cushion layers 24 are layered over the carcass 12 near each end (44b) of the belt 14. The cushion layers 24 are formed of a soft crosslinked rubber. The cushion layers 24 absorb a stress of each end (44b) of the belt 14. Lifting of the belt 14 is restrained by the cushion layers 24.

The chafers 26 are disposed in the vicinity of the beads 10, respectively. When the tire 2 is mounted to a rim, the chafers 26 abut against the rim. The vicinity of each bead 10 is protected due to the abutment. In the present embodiment, the chafers 26 and the clinches 8 are integrally formed. Therefore, a material of the chafers 26 and a material of the clinches 8 are the same. The chafers 26 may be formed of a fabric and a rubber impregnated into the fabric.

Figure 3:
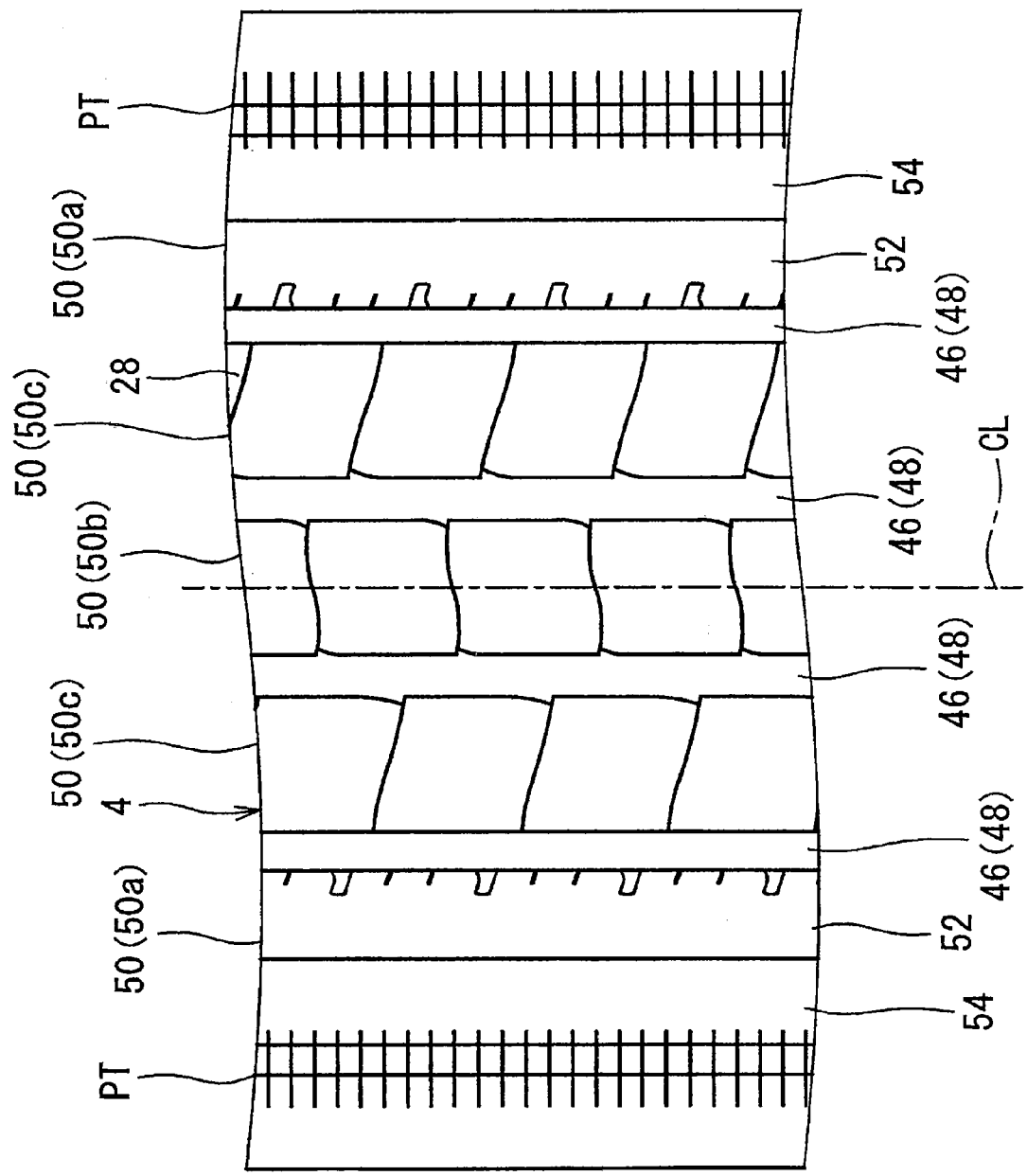
FIG. 3 is an enlarged cross-sectional view of a portion of the tire shown in FIG. 1.

FIG. 3 is a development of a tread pattern of the tire 2. In FIG. 3, the upward/downward direction represents the circumferential direction, the leftward/rightward direction represents the axial direction, and the direction orthogonal to the surface of the sheet represents the radial direction.

In the tire 2, grooves 46 are formed in the tread surface 28 of the tread 4. Thus, a tread pattern is formed. In the tire 2, the grooves 46 include main grooves 48 that continuously extend in the circumferential direction. Each main groove 48 has a width that is greater than or equal to 5 mm and not greater than 15 mm, and a depth that is greater than or equal to 11 mm and not greater than 16 mm.

In the tire 2, due to the main grooves 48 being formed in the tread 4, land portions 50 are formed so as to be aligned with each other in the axial direction. In the tire 2, each land portion 50 is formed as a single unit that continuously extends in the circumferential direction. The land portion 50 thus formed may be referred to as a rib. In other words, each land portion 50 of the tire 2 is formed as a rib that extends in the circumferential direction.

As shown in FIG. 3, since the number of the main groves 48 formed in the tread 4 of the tire 2 is four, the number of the land portions 50 formed is five. Among the land portions 50, the land portions 50 positioned on the outer sides in the axial direction are referred to as shoulder land portions (50*a*), the land portion 50 positioned on the equator plane is referred to as a center land portion (50*b*), and the land portions 50 positioned between each shoulder land portion (50*a*) and the center land portion (50*b*) are referred to as middle land portions (50*c*). The tread 4 of the tire 2 includes: the center land portion (50*b*); a pair of the middle land portions (50*c*) each of which is positioned outward of the center land portion (50*b*) in the axial direction, and a pair of the shoulder land portions (50*a*) which are positioned outward of the middle land portions (50*c*), respectively, in the axial direction.

As described above, the tread 4 includes the base layer 30, and the cap layer 32 that is layered outward of the base layer 30 in the radial direction. Therefore, the shoulder land portions (50*a*) each of which forms a portion of the tread 4 include the base layer 30 and the cap layer 32 that is layered outward of the base layer 30 in the radial direction. The center land portion (50*b*) and the middle land portions (50*c*) each include the base layer 30, and the cap layer 32 that is layered outward of the base layer 30 in the radial direction.

As shown in FIG. 2, in the tire 2, the cap layer 32 in each shoulder land portion (50*a*) includes a body portion 52 and a pad 54 each of which has an outer surface that forms a portion of the tread surface 28. The body portion 52 is layered over the base layer 30. The body portion 52 has a cut portion 56 on the outer side thereof in the axial direction. The cut portion 56 has a first surface (56*a*) that extends from the tread surface 28 inward in the radial direction, and a second surface (56*b*) that extends from the first surface (56*a*) outward in the axial direction. As shown in the drawings, the body portion 52 is sandwiched between the pad 54 and the base layer 30. The pad 54 is layered over the body portion 52. More specifically, the pad 54 is joined to the body portion 52 at the cut portion 56. In the tire 2, the body portion 52 and the cap layer 32 of each middle land portion (50*c*) are integrally formed. The cap layer 32 of each middle land portion (50*c*) and the cap layer 32 of the center land portion (50*b*) are integrally formed.

Figure 4:
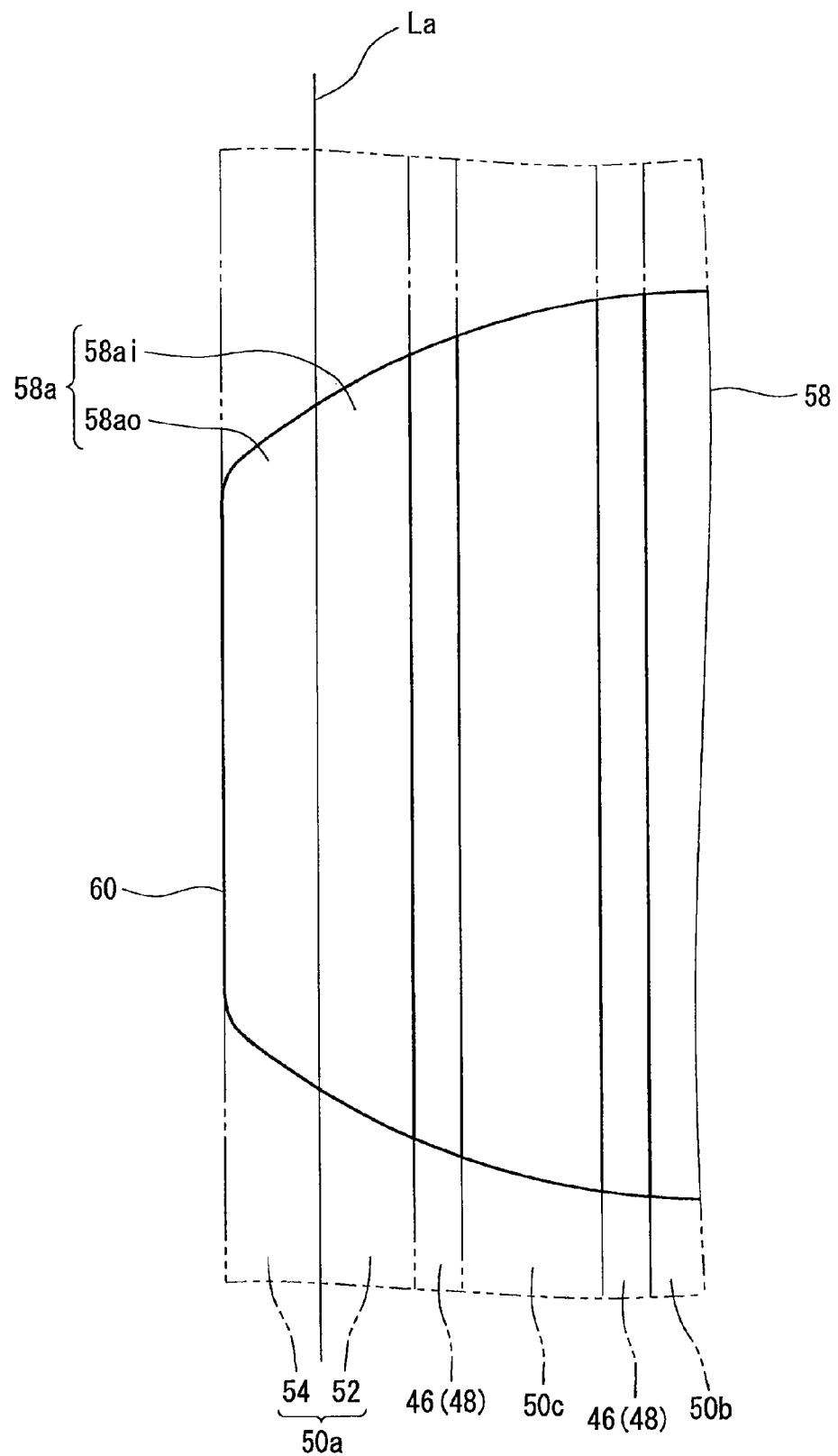
FIG. 4 is a schematic diagram illustrating a state where the tire shown in FIG. 1 is in contact with a road surface.

FIG. 4 illustrates a state where the tread 4 of the tire 2 is in contact with a road surface, in other words, schematically illustrates a portion of a ground-contact surface 58. In FIG. 4, only the main groves 48, among multiple groves 46 forming the tread pattern, are illustrated. In the state, the ground-contact surface 58 of the tire 2 can be observed, and a ground-contact pressure can be measured. For example, a ground-contact pressure can be measured by using a pressure distribution measurement device available from Tekscan, Inc. This device allows ground-contact pressures to be measured at intervals of 1.5 mm in various portions of the ground-contact surface 58. For this measurement, a load is set as 31.87 kN, and an air pressure of the tire 2 is set as 800 kPa.

In FIG. 4, a solid line "La" represents a position of a boundary between the body portion 52 and the pad 54 that form the shoulder land portion (50*a*). In an embodiment of the present invention, a portion, of the ground-contact surface (58*a*) of each shoulder land portion (50*a*), outward of the boundary (La) in the axial direction, is referred to as an outer ground-contact surface (58*ao*). A portion, of the ground-contact surface (58*a*) of each shoulder land portion (50*a*), inward of the boundary (La) in the axial direction, is referred to as an inner ground-contact surface (58*ai*). The inner ground-contact surface (58*ai*) is disposed inward of the outer ground-contact surface (58*ao*) in the axial direction. The outer ground-contact surface (58*ao*) corresponds to an outer surface of the pad 54 that is in contact with the ground. The inner ground-contact surface (58*ai*) corresponds to an outer surface of the body portion 52 that is in contact with the ground.

In the tire 2, when the ground-contact surface (58*a*) of each shoulder land portion (50*a*) is separated into the outer ground-contact surface (58*ao*) and the inner ground-contact surface (58*ai*) by the boundary (La), a ratio of an average ground-contact pressure (P1A) of the outer ground-contact surface (58*ao*) relative to an average ground-contact pressure (P1B) of the inner ground-contact surface (58*ai*) is greater than or equal to 0.85, and is not greater than 0.95. When the ratio is set so as to be greater than or equal to 0.85, a difference between the average ground-contact pressure (P1A) of the outer ground-contact surface (58*ao*) and the average ground-contact pressure (P1B) of the inner ground-contact surface (58*ai*) is restrained from being increased. In the tire 2, the average ground-contact pressure (P1A) of the outer ground-contact surface (58*ao*) is not excessively low. In the tire 2, generation of shoulder wear is restrained. From this viewpoint, the ratio is more preferably greater than or equal to 0.87. When the ratio is set so as to be not greater than 0.95, the average ground-contact pressure (P1A) of the outer ground-contact surface (58*ao*) is appropriately maintained. In the tire 2, the average ground-contact pressure (P1A) of the outer ground-contact surface (58*ao*) is not excessively high. In the tire 2, generation of step wear is restrained. From this viewpoint, the ratio is more preferably not greater than 0.93. Thus, in the tire 2, the ratio of the average ground-contact pressure (P1A) of the outer ground-contact surface (58*ao*) relative to the average ground-contact pressure (P1B) of the inner ground-contact surface (58*ai*) is appropriately adjusted, thereby preventing generation of shoulder wear and step wear. The tire 2 is excellent in resistance to uneven wear.

In FIG. 1, a double-headed arrow "TW" represents a distance, in the axial direction, from one of the ends (PT) of the tread 4 to the other (not shown) of the ends of the tread 4. The distance "TW" represents a width of the tread 4 in the axial direction. A double-headed arrow "BW" represents a distance, in the axial direction, from one of the ends (44*b*) of the belt 14 to the other (not shown) of the ends (44*b*) of the belt 14. The distance "BW" represents a width of the belt 14 in the axial direction.

In the tire 2, a ratio of the width (BW) in the axial direction relative to the width (TW) in the axial direction, is greater than or equal to 0.95, and is not greater than 1.0. When the ratio is set so as to be greater than or equal to 0.95, the belt 14 supports the shoulder land portions (50*a*), thereby appropriately maintaining a ground-contact pressure of each shoulder land portion (50*a*). Thus, in the tire 2, generation of shoulder wear is effectively restrained. When the ratio is set so as to be not greater than 1.0, a distance from the end (44b) of the belt 14 to the end (PT) of the tread 4 is appropriately maintained. In the tire 2, damage that may occur due to the belt 14 is prevented. The tire 2 is excellent in durability.

In the tire 2, the pad 54 is disposed on the outer side of the tread 4 in the axial direction. The outer surface of the pad 54 includes a ground-contact end 60 (see FIG. 4) of the ground-contact surface 58. In the tire 2, a complex elastic modulus (E1A) of the pad 54 is greater than a complex elastic modulus (E1B) of the body portion 52. The pad 54 has a high stiffness. The pad 54 can contribute to prevention of generation of shoulder wear and step wear. The tire 2 is excellent in resistance to uneven wear. From this viewpoint, the complex elastic modulus (E1A) of the pad 54 is preferably greater than or equal to 5.55 MPa, and is preferably not greater than 5.75 MPa.

In an embodiment of the present invention, the complex elastic modulus (E1A) of the pad 54, the complex elastic modulus (E1B) of the body portion 52, and a loss tangent (L1A) of the pad 54 and a loss tangent (L1B) of the body portion 52 which are described below, are measured in compliance with the standard of JIS K 6394. The measurement conditions are as follows.

Viscoelasticity spectrometer: "VESF-3" manufactured by Iwamoto Seisakusho
Initial strain: 10%
Dynamic strain: ±1%
Frequency: 10 Hz
Deformation mode: tension
Measurement temperature: 70° C.

In the tire 2, the complex elastic modulus (E1B) of the body portion 52 is greater than or equal to 4.95 MPa, and is not greater than 5.45 MPa. The complex elastic modulus (E1B) of the body portion 52 is less than the complex elastic modulus (E1A) of the pad 54. The body portion 52 has a low stiffness. The body portion 52 that is soft can contribute to low fuel consumption performance of the tire 2.

In the tire 2, a loss tangent (L1B) of the body portion 52 is less than a loss tangent (L1A) of the pad 54. In the body portion 52, heat generation caused by repeated deformation is restrained. In the tire 2, loss of energy is small in the body portion 52. The tire 2 is excellent in low fuel consumption performance. From this viewpoint, the loss tangent (L1B) of the body portion 52 is preferably less than or equal to 0.082, and is preferably not less than 0.068.

In the tire 2, the loss tangent (L1A) of the pad 54 is greater than or equal to 0.108, and is not greater than 0.122. The loss tangent (L1A) of the pad 54 is greater than the loss tangent (L1B) of the body portion 52. The pad 54 has a high stiffness. The pad 54 can contribute to prevention of generation of shoulder wear and step wear.

In FIG. 2, Reference Character "LS" represents an inner edge of each shoulder land portion (50a) on the inner side thereof in the axial direction. Reference Character "LA" represents the boundary between the body portion 52 and the pad 54. A double-headed arrow "W1" represents a distance, in the axial direction, from the inner edge (LS) to the end (PT) of the tread 4. The distance "W1" represents a width of each shoulder land portion (50a) in the axial direction. A double-headed arrow "W1A" represents a distance, in the axial direction, from the boundary (LA) to the end (PT) of the tread 4. The distance "W1A" represents a width of the pad 54 in the axial direction.

In the tire 2, a ratio of the width (W1A), in the axial direction, of the pad 54 relative to the width (W1), in the axial direction, of the shoulder land portion (50a), is greater than or equal to 0.30, and is not greater than 0.60. When the ratio is set so as to be greater than or equal to 0.30, the pad 54 can effectively restrain generation of shoulder wear and step wear. From this viewpoint, the ratio is more preferably greater than or equal to 0.35. When the ratio is set so as to be not greater than 0.60, the body portion 52 can effectively contribute to low fuel consumption performance of the tire 2. From this viewpoint, the ratio is more preferably not greater than 0.58.

In FIG. 2, a solid line "LB" represents a straight line that extends in the radial direction so as to pass through the end (44b) of the belt 14. Reference Character "P1" represents a point of intersection between the solid line (LB) and the outer surface of the pad 54. Reference Character "P2" represents a point of intersection between the solid line (LB) and the inner surface of the pad 54. A double-headed arrow "H1" represents a height, in the radial direction, from the end (44b) of the belt 14 to the point (P1) of intersection. The height "H1" represents a thickness of the shoulder land portion (50a). A double-headed arrow "H1A" represents a height, in the radial direction, from the point (P2) of intersection to the point (P1) of intersection. The height "H1A" represents a thickness of the pad 54.

In the tire 2, a ratio of the thickness (H1A) of the pad 54 to the thickness (H1) of the shoulder land portion (50a) is greater than or equal to 0.30, and is not greater than 0.35. When the ratio is set so as to be greater than or equal to 0.30, the pad 54 can effectively restrain generation of shoulder wear and step wear. From this viewpoint, the ratio is more preferably greater than or equal to 0.31. When the ratio is set so as to be not greater than 0.35, the body portion 52 can effectively contribute to low fuel consumption performance of the tire 2. From this viewpoint, the ratio is more preferably not greater than 0.34.

In the tire 2, the base layer 30 that forms a portion of the tread 4 preferably has a loss tangent that is less than the loss tangent (L1B) of the body portion 52. The base layer 30 can contribute to low fuel consumption performance and durability of the tire 2. From this viewpoint, the loss tangent of the base layer 30 is preferably less than or equal to 0.065. From the viewpoint of stiffness of the base layer 30 being appropriately maintained, the loss tangent of the base layer 30 is preferably not less than 0.035. In the same viewpoint, a complex elastic modulus of the base layer 30 is preferably greater than or equal to 3 MPa, and is preferably not greater than 6 MPa. The loss tangent and the complex elastic modulus of the base layer 30 are measured in the same manner as described above for the complex elastic modulus (E1A) of the pad 54, the complex elastic modulus (E1B) of the body portion 52, and the loss tangent (L1A) of the pad 54 and the loss tangent (L1B) of the body portion 52.

In an embodiment of the present invention, a dimension and an angle of each component of the tire 2 are measured in a state where the tire 2 is mounted to a normal rim, and the tire 2 is filled with air so as to obtain a normal internal pressure. During the measurement, no load is applied to the tire 2. In the description herein, the normal rim represents a rim which is specified according to the standard with which the tire 2 complies, and is the "standard rim" in the JATMA standard, the "Design Rim" in the TRA standard, and the "Measuring Rim" in the ETRTO standard. In the description herein, the normal internal pressure represents an internal pressure which is specified according to the standard with which the tire 2 complies, and is the "maximum air pressure" in the JATMA standard, the "maximum value" recited in "TIRE LOAD LIMITS AT VARIOUS COLD INFLATION PRESSURES" in the TRA standard, and the "INFLATION PRES- SURE" in the ETRTO standard. In the case of passenger cars, the dimension and the angle are measured in a state where the internal pressure is 180 kPa. Dimensions and angles of components of a tire described below are measured in the same manner.

Figure 5:
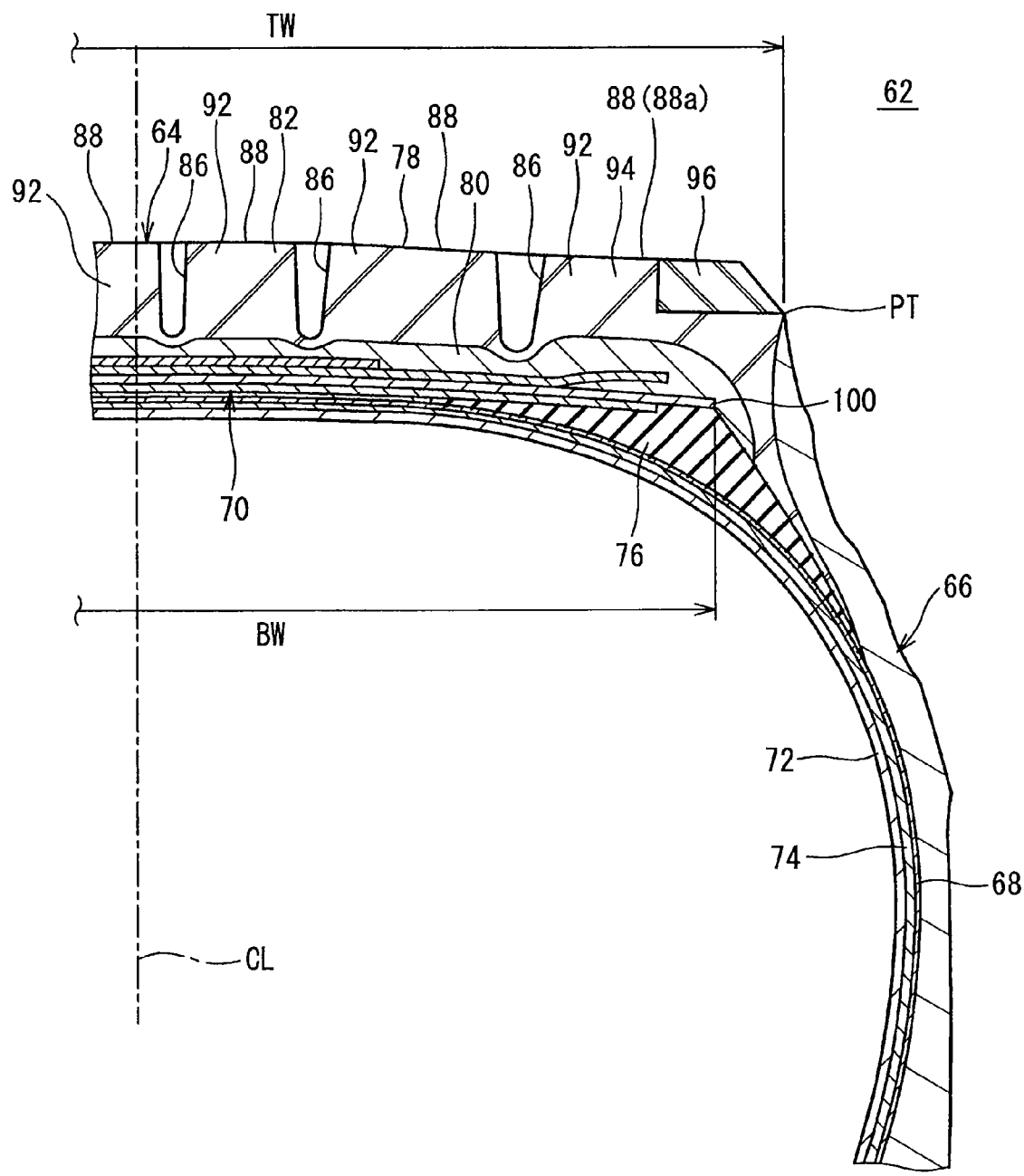
FIG. 5 is a cross-sectional view of a portion of a heavy duty pneumatic tire according to another embodiment of the present invention.
Figure 6:
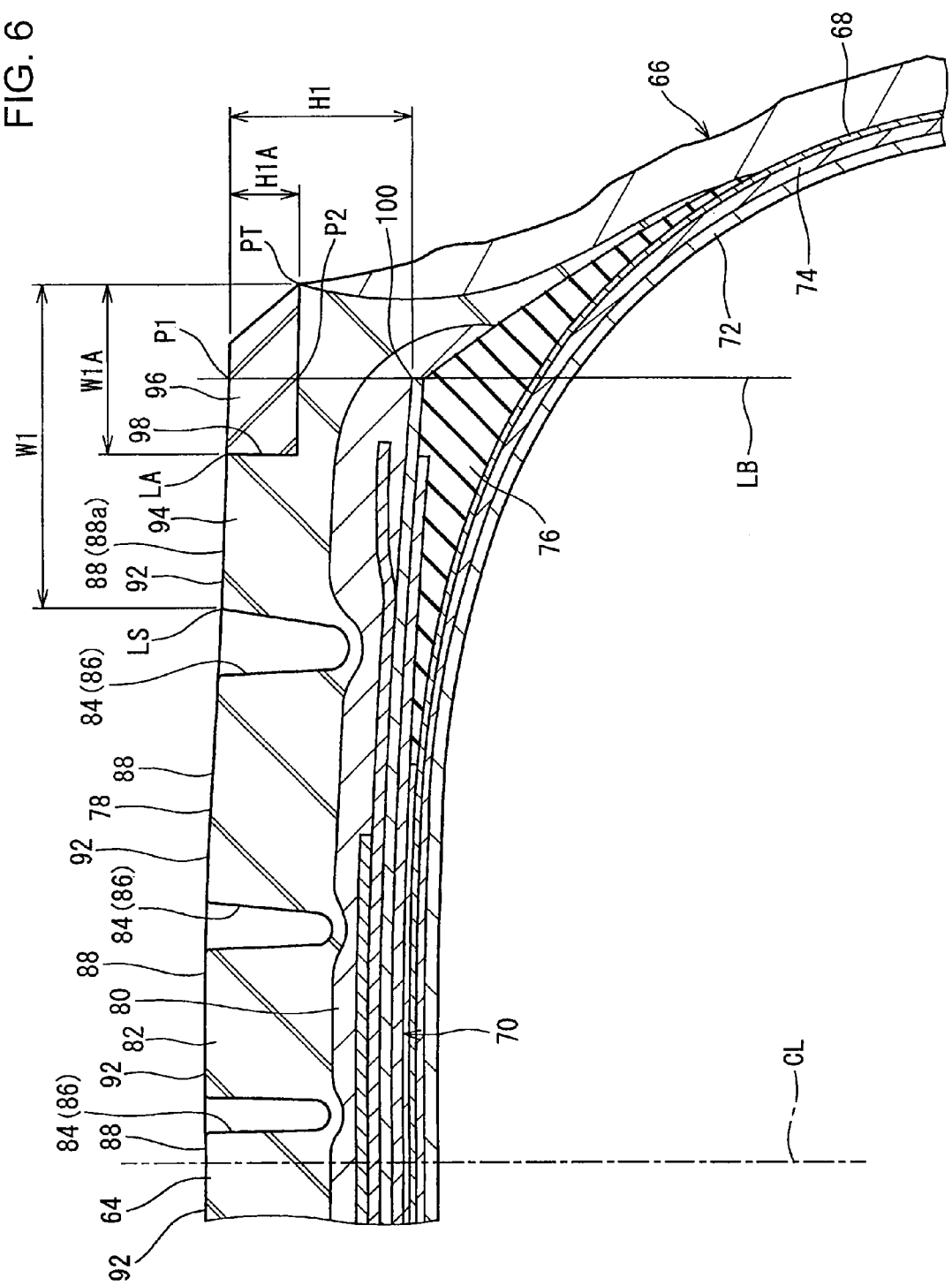
FIG. 6 is a development of a portion of a tread pattern of the tire shown in FIG. 5.

FIG. 5 and FIG. 6 show a pneumatic tire 62 according to another embodiment of the present invention. The tire 62 is mounted to trucks, buses, and the like, similarly to the tire 2 shown in FIG. 1. The tire 62 is a heavy duty pneumatic tire. In FIGS. 5 and 6, the upward/downward direction represents the radial direction of the tire 62, the leftward/rightward direction represents the axial direction of the tire 62, and the direction orthogonal to the surface of the sheet represents the circumferential direction of the tire 62. In the drawings, an alternate long and short dash line "CL" represents the equator plane of the tire 62. The tire 62 has a shape that is symmetric about the equator plane except a tread pattern. FIG. 6 is a partially enlarged view of the tire 62 shown in FIG. 5.

The tire 62 includes a tread 64, sidewalls 66, a carcass 68, a belt 70, an inner liner 72, an insulation 74, and cushion layers 76. The tire 62 includes clinches, beads, reinforcing layers, cover rubbers, and chafers, which are not shown. The tire 62 has almost the same structure as the tire 2 shown in FIG. 1 except the tread 64.

The tread 64 has a shape projecting outward in the radial direction. The tread 64 is formed of a crosslinked rubber. The tread 64 forms a tread surface 78 that can contact with a road surface. In the drawings, Reference Character "PT" represents an end of the tread 64.

The tread 64 includes a base layer 80 and a cap layer 82. The cap layer 82 is disposed outward of the base layer 80 in the radial direction. The cap layer 82 is layered over the base layer 80.

Figure 7:
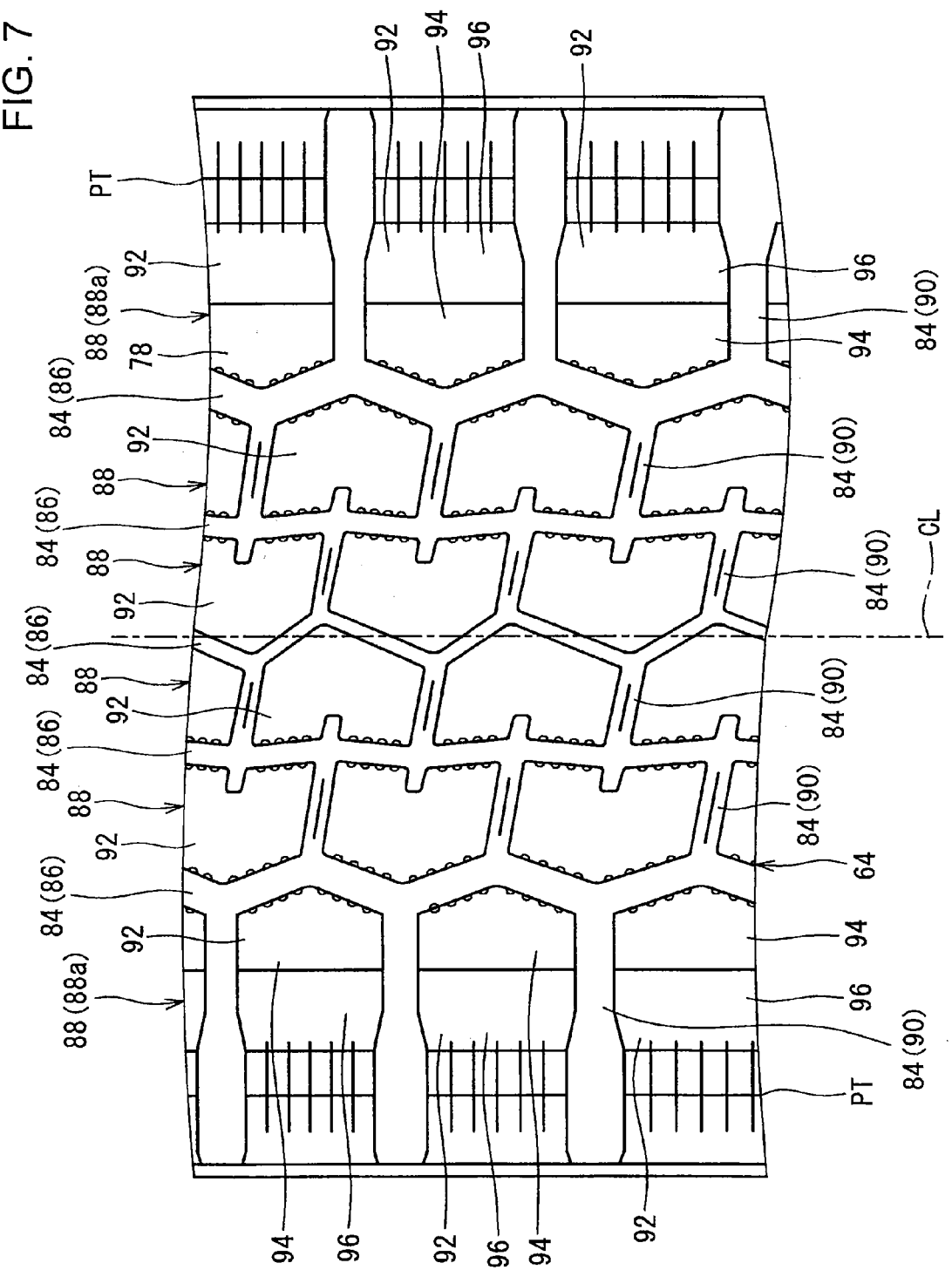
FIG. 7 is an enlarged cross-sectional view of a portion of the tire shown in FIG. 5.

FIG. 7 is a development of a tread pattern of the tire 62. In FIG. 7, the upward/downward direction represents the circumferential direction, the leftward/rightward direction represents the axial direction, and the direction orthogonal to the surface of the sheet represents the radial direction.

In the tire 62, grooves 84 are formed in the tread surface 78 of the tread 64. Thus, a tread pattern is formed. In the tire 62, the grooves 84 include main grooves 86 that continuously extend in almost the circumferential direction. Each main groove 86 has a width that is greater than or equal to 5 mm, and is not greater than 15 mm, and a depth that is greater than or equal to 14 mm, and is not greater than 18 mm.

In the tire 62, due to the main grooves 86 being formed in the tread 64, land portions 88 are formed so as to be aligned with each other in the axial direction. As shown in FIG. 7, since the number of the main grooves 86 formed in the tread 64 of the tire 62 is five, the number of the land portions 88 formed is six. Among the land portions 88, the land portions 88 positioned on the outer sides in the axial direction are referred to as shoulder land portions (88a).

As shown in FIG. 7, in addition to the main grooves 86 described above, subsidiary grooves 90 are formed, in the tread surface 78 of the tire 62, so as to extend in almost the axial direction. Each subsidiary groove 90 has a width that is greater than or equal to 3 mm, and is not greater than 31 mm, and has a depth that is greater than or equal to 3 mm, and is not greater than 18 mm. The land portions 88 are divided by the subsidiary grooves 90. Thus, blocks 92 are formed in each land portion 88. The blocks 92 are provided so as to be spaced from each other in the circumferential direction. In other words, each land portion 88 of the tire 62 is formed of the blocks 92 that are aligned with each other in the circumferential direction.

As described above, the tread 64 includes the base layer 80, and the cap layer 82 that is layered outward of the base layer 80 in the radial direction. Therefore, each block 92 of the shoulder land portions (88a) includes the base layer 80, and the cap layer 82 that is layered outward of the base layer 80 in the radial direction. Each block 92 of the land portions 88 other than the shoulder land portions (88a) includes the base layer 80, and the cap layer 82 that is layered outward of the base layer 80 in the radial direction.

As shown in FIG. 6, in the tire 62, the cap layer 82 of each block 92 of the shoulder land portions (88a) includes a body portion 94 and a pad 96 each of which has an outer surface that forms a portion of the tread surface 78. The body portion 94 is layered over the base layer 80. The body portion 94 has a cut portion 98 on the outer side thereof in the axial direction. The pad 96 is joined to the body portion 94 at the cut portion 98. In the tire 62, the body portion 94 and the cap layer 82 of the blocks 92 of the land portions 88 other than the shoulder land portions (88a) are integrally formed.

In the tire 62, when a ground-contact surface of each block 92 of the shoulder land portions (88a) is separated into an outer ground-contact surface and an inner ground-contact surface by a boundary between the body portion 94 and the pad 96 of the block 92 of the shoulder land portions (88a), a ratio of an average ground-contact pressure (P1A) of the outer ground-contact surface relative to an average ground-contact pressure (P1B) of the inner ground-contact surface is greater than or equal to 0.85, and is not greater than 0.95. When the ratio is set so as to be greater than or equal to 0.85, a difference between the average ground-contact pressure (P1A) of the outer ground-contact surface and the average ground-contact pressure (P1B) of the inner ground-contact surface is restrained from being increased. In the tire 62, the average ground-contact pressure (P1A) of the outer ground-contact surface is not excessively low. In the tire 62, generation of shoulder wear is restrained. From this viewpoint, the ratio is more preferably greater than or equal to 0.87. When the ratio is set so as to be not greater than 0.95, the average ground-contact pressure (P1A) of the outer ground-contact surface is appropriately maintained. In the tire 62, the average ground-contact pressure (P1A) of the outer ground-contact surface is not excessively high. In the tire 62, generation of triangular wear is restrained. From this viewpoint, the ratio is more preferably not greater than 0.93. Thus, in the tire 62, the ratio of the average ground-contact pressure (P1A) of the outer ground-contact surface relative to the average ground-contact pressure (P1B) of the inner ground-contact surface is appropriately adjusted, thereby preventing generation of shoulder wear and triangular wear. The tire 62 is excellent in resistance to uneven wear. For the tire 62, the average ground-contact pressure (P1A) of the outer ground-contact surface and the average ground-contact pressure (P1B) of the inner ground-contact surface are measured in the same manner as described for the tire 2 shown in FIG. 1.

In FIG. 5, a double-headed arrow "TW" represents a distance, in the axial direction, from one of the ends (PT) of the tread 64 to the other (not shown) of the ends of the tread 64. The distance "TW" represents a width of the tread 64 in the axial direction. A double-headed arrow "BW" represents a distance, in the axial direction, from one of ends 100 of the belt 70 to the other (not shown) of the ends 100 of the belt 70. The distance "BW" represents a width of the belt 70 in the axial direction.

In the tire 62, a ratio of the width (BW) in the axial direction relative to the width (TW) in the axial direction is greater than or equal to 0.95, and is not greater than 1.0. When the ratio is set so as to be greater than or equal to 0.95, the belt 70 supports the blocks 92 of the shoulder land portions (88a), thereby appropriately maintaining a ground contact pressure of the blocks 92. Thus, in the tire 62, generation of shoulder wear is effectively restrained. When the ratio is set so as to be not greater than 1.0, the distance from the end 100 of the belt 70 to the end (PT) of the tread 64 is appropriately maintained. In the tire 62, damage that may occur due to the belt 70 is prevented. The tire 62 is excellent in durability.

In the tire 62, the pad 96 is disposed on the outer side of the tread 64 in the axial direction. The outer surface of the pad 96 includes a ground-contact end of the ground-contact surface. In the tire 62, a complex elastic modulus (E1A) of the pad 96 is greater than a complex elastic modulus (E1B) of the body portion 94. The pad 96 has a high stiffness. The pad 96 can contribute to prevention of generation of shoulder wear and triangular wear. The tire 62 is excellent in resistance to uneven wear. From this viewpoint, the complex elastic modulus (E1A) of the pad 96 is preferably greater than or equal to 5.55 MPa, and is preferably not greater than 5.75 MPa. For the tire 62, the complex elastic modulus (E1A) of the pad 96, the complex elastic modulus (E1B) of the body portion 94, and a loss tangent (L1A) of the pad 96 and a loss tangent (L1B) of the body portion 94 which are described below, are measured in the same manner as described for the tire 2 shown in FIG. 1.

In the tire 62, the complex elastic modulus (E1B) of the body portion 94 is greater than or equal to 4.95 MPa, and is not greater than 5.45 MPa. The complex elastic modulus (E1B) of the body portion 94 is less than the complex elastic modulus (E1A) of the pad 96. The body portion 94 has a low stiffness. The body portion 94 that is soft can contribute to low fuel consumption performance of the tire 62.

In the tire 62, a loss tangent (L1B) of the body portion 94 is less than a loss tangent (L1A) of the pad 96. In the body portion 94, heat generation caused by repeated deformation is restrained. In the tire 62, loss of energy is small in the body portion 94. The tire 62 is excellent in low fuel consumption performance. From this viewpoint, the loss tangent (L1B) of the body portion 94 is preferably less than or equal to 0.082, and is preferably not less than 0.068.

In the tire 62, the loss tangent (L1A) of the pad 96 is greater than or equal to 0.108, and is not greater than 0.122. The loss tangent (L1A) of the pad 96 is greater than the loss tangent (L1B) of the body portion 94. The pad 96 has a high stiffness. The pad 96 can contribute to prevention of generation of shoulder wear and triangular wear.

In FIG. 6, Reference Character "LS" represents an inner edge of each block 92 of the shoulder land portions (88a) on the inner side thereof in the axial direction. Reference Character "LA" represents a boundary between the body portion 94 and the pad 96. A double-headed arrow "W1" represents a distance, in the axial direction, from the inner edge (LS) to the end (PT) of the tread 64. The distance "W1" represents a width, in the axial direction, of each block 92 of the shoulder land portions (88a). The width "W1" in the axial direction represents a maximum width of each block 92. A double-headed arrow "W1A" represents a distance, in the axial direction, from the boundary (LA) to the end (PT) of the tread 64. The distance "W1" represents a width of the pad 96 in the axial direction.

In the tire 62, a ratio of the width (W1A), in the axial direction, of the pad 96 relative to the width (W1), in the axial direction, of each block 92 of the shoulder land portions (88a), is greater than or equal to 0.30, and is not greater than 0.60. When the ratio is set so as to be greater than or equal to 0.30, the pad 96 can effectively restrain generation of shoulder wear and triangular wear. From this viewpoint, the ratio is more preferably greater than or equal to 0.35. When the ratio is set so as to be not greater than 0.60, the body portion 94 can effectively contribute to low fuel consumption performance of the tire 62. From this viewpoint, the ratio is more preferably not greater than 0.58.

In FIG. 6, a solid line "LB" represents a straight line that extends in the radial direction so as to pass through the end 100 of the belt 70. Reference Character "P1" represents a point of intersection between the solid line (LB) and the outer surface of the pad 96. Reference Character "P2" represents a point of intersection between the solid line (LB) and the inner surface of the pad 96. A double-headed arrow "H1" represents a height, in the radial direction, from the end 100 of the belt 70 to the point (P1) of intersection. The height "H1" represents a thickness of each block 92 of the shoulder land portions (88a). A double-headed arrow "H1A" represents a height, in the radial direction, from the point (P2) of intersection to the point (P1) of intersection. The height "H1A" represents a thickness of the pad 96.

In the tire 62, a ratio of the thickness (H1A) of the pad 96 relative to the thickness (H1) of each block 92 of the shoulder land portions (88a) is greater than or equal to 0.30, and is not greater than 0.35. When the ratio is set so as to be greater than or equal to 0.30, the pad 96 can effectively restrain generation of shoulder wear and triangular wear. From this viewpoint, the ratio is more preferably greater than or equal to 0.31. When the ratio is set so as to be not greater than 0.35, the body portion 94 can effectively contribute to low fuel consumption performance of the tire 62. From this viewpoint, the ratio is more preferably not greater than 0.34.

EXAMPLES

Hereinafter, effects of an embodiment of the present invention will become apparent according to examples. However, the present invention should not be restrictively construed based on the description of examples.

Experiment A

Tire Having Rib Pattern

Example 1

Heavy duty pneumatic tires, according to Example 1, having the fundamental structure shown in FIG. 1, and specifications indicated below in Table 1, were obtained. The size of each tire was 12R22.5. A ratio (P1A/P1B) of the average ground-contact pressure (P1A) of the outer ground-contact surface relative to the average ground-contact pressure (P1B) of the inner ground-contact surface in each shoulder land portion, was 0.90. A ratio (BW/TW) of the width (BW) of the belt to the width (TW) of the tread was 0.98. The complex elastic modulus (E1A) of the pad was 5.70 MPa. The loss tangent (L1A) of the pad was 0.115. The complex elastic modulus (E1B) of the body portion was 5.10 MPa. The loss tangent (L1B) of the body portion was 0.075. A ratio of the thickness (H1A) of the pad relative to the thickness (H1) of each shoulder land portion was 0.33. A ratio of the width (W1A) of the pad relative to the width (W1) of each shoulder land portion was 0.50.

Example 2 to 3 and Comparative Example 1 to 2

Tires were each obtained so as to have the same structure and specifications as those for Example 1 except that the ratio (P1A/P1B) was as indicated below in Table 1.

Comparative Example 3 to 7

Tires were each obtained so as to have the same structure and specifications as those for Example 1 except that the complex elastic modulus (E1A) and the loss tangent (L1A) of the pad, and the complex elastic modulus (E1B) and the loss tangent (L1B) of the body portion were as indicated below in Table 2.

Example 4 to 5 and Comparative Example 8 to 9

Tires were each obtained so as to have the same structure and specifications as those for Example 1 except that the ratio (H1A/H1) and the ratio (W1A/W1) were as indicated below in Table 3.

Generated State of Uneven Wear and Amount of Wear I

Test tires were each mounted to a high-speed bus. The size of a rim was 8.25×22.5. An internal pressure of each tire was adjusted to 800 kPa. The high-speed bus was caused to run 30000 km in a fully loaded state. After the running, a generated state of uneven wear in each tire mounted to a front wheel was visually checked, and an amount of wear in the shoulder land portions of each tire was measured. The results are indicated below in Table 1 to Table 3. In the tables, "D" represents a case where shoulder wear or step wear was found, and "-" represents a case where no wear was found.

Fuel Consumption Performance

An average of fuel consumption (a running distance per one liter of light oil) of five high-speed buses that had run 30000 km, was measured. The average value represents fuel consumption performance, and is indicated below as an index in Table 1 to Table 3 on the assumption that a value of an index for Example 1 is 100. The greater the value is, the higher the evaluation is.

TABLE 1

| | | Evaluation Results | | | | |
|---|---|---|---|---|---|---|
| | | Comparative Example 1 | Example 2 | Example 1 | Example 3 | Comparative Example 2 |
| Ratio (P1A/P1B) | | 0.84 | 0.87 | 0.90 | 0.93 | 0.96 |
| Ratio (BW/TW) | | 0.98 | 0.98 | 0.98 | 0.98 | 0.98 |
| Complex Elastic Modulus E1A [MPa] | | 5.70 | 5.70 | 5.70 | 5.70 | 5.70 |
| Complex Elastic Modulus E1B [MPa] | | 5.10 | 5.10 | 5.10 | 5.10 | 5.10 |
| Loss Tangent L1A [—] | | 0.115 | 0.115 | 0.115 | 0.115 | 0.115 |
| Loss Tangent L1B [—] | | 0.075 | 0.075 | 0.075 | 0.075 | 0.075 |
| Ratio (H1A/H1) | | 0.33 | 0.33 | 0.33 | 0.33 | 0.33 |
| Ratio (W1A/W1) | | 0.50 | 0.50 | 0.50 | 0.50 | 0.50 |
| Generated State of Uneven Wear | Shoulder Wear | D | D | — | — | — |
| | Step Wear | — | — | — | D | D |
| Amount of Wear [mm] | | 0.6 | 0.4 | 0.0 | 0.3 | 0.6 |
| Fuel Consumption Performance | | 100 | 100 | 100 | 100 | 100 |

TABLE 2

| | | Evaluation Results | | | | |
|---|---|---|---|---|---|---|
| | | Comparative Example 3 | Comparative Example 4 | Comparative Example 5 | Comparative Example 6 | Comparative Example 7 |
| Ratio (P1A/P1B) | | 0.90 | 0.90 | 0.90 | 0.90 | 0.90 |
| Ratio (BW/TW) | | 0.98 | 0.98 | 0.98 | 0.98 | 0.98 |
| Complex Elastic Modulus E1A [MPa] | | 5.10 | 5.10 | 5.70 | 5.70 | 5.70 |
| Complex Elastic Modulus E1B [MPa] | | 5.10 | 5.70 | 5.70 | 5.10 | 5.10 |
| Loss Tangent L1A [—] | | 0.075 | 0.075 | 0.115 | 0.115 | 0.115 |
| Loss Tangent L1B [—] | | 0.075 | 0.115 | 0.115 | 0.075 | 0.075 |
| Ratio (H1A/H1) | | 0.33 | 0.33 | 0.33 | 0.10 | 0.43 |
| Ratio (W1A/W1) | | 0.50 | 0.50 | 0.50 | 0.50 | 0.50 |
| Generated State of Uneven Wear | Shoulder Wear | — | — | — | — | — |
| | Step Wear | D | D | D | D | — |
| Amount of Wear [mm] | | 0.6 | 0.3 | 0.2 | 0.7 | 0.0 |
| Fuel Consumption Performance | | 103 | 95 | 90 | 101 | 95 |

TABLE 3

| | Comparative Example 8 | Comparative Example 9 | Example 4 | Example 5 |
|---|---|---|---|---|
| Ratio (P1A/P1B) | 0.90 | 0.90 | 0.90 | 0.90 |
| Ratio (BW/TW) | 0.98 | 0.98 | 0.98 | 0.98 |
| Complex Elastic Modulus E1A [MPa] | 5.70 | 5.70 | 5.70 | 5.70 |
| Complex Elastic Modulus E1B [MPa] | 5.10 | 5.10 | 5.10 | 5.10 |
| Loss Tangent L1A [—] | 0.115 | 0.115 | 0.115 | 0.115 |
| Loss Tangent L1B [—] | 0.075 | 0.075 | 0.075 | 0.075 |
| Ratio (H1A/H1) | 0.33 | 0.33 | 0.31 | 0.34 |
| Ratio (W1A/W1) | 0.20 | 0.65 | 0.45 | 0.55 |
| Generated State of Uneven Wear — Shoulder Wear | — | — | — | — |
| Generated State of Uneven Wear — Step Wear | D | — | D | — |
| Amount of Wear [mm] | 0.6 | 0.0 | 0.2 | 0.0 |
| Fuel Consumption Performance | 101 | 98 | 100 | 100 |

As indicated in Table 1 to Table 3, evaluations for the tires of Examples are higher than evaluations for the tires of Comparative Examples. The evaluation results clearly indicate that the tires according to an embodiment of the present invention is superior.

Experiment B

Tire Having Block Pattern

Example 6

Heavy duty pneumatic tires, according to Example 6, having the fundamental structure shown in FIG. 5, and specifications indicated below in Table 5, were obtained. The size of each tire was 12R22.5. A ratio (P1A/P1B) of the average ground-contact pressure (P1A) of the outer ground-contact surface relative to the average ground-contact pressure (P1B) of the inner ground-contact surface in each shoulder land portion, was 0.90. A ratio (BW/TW) of the width (BW) of the belt to the width (TW) of the tread was 0.98. The complex elastic modulus (E1A) of the pad was 5.60 MPa. The loss tangent (L1A) of the pad was 0.115. The complex elastic modulus (E1B) of the body portion was 5.20 MPa. The loss tangent (L1B) of the body portion was 0.075. A ratio of the thickness (H1A) of the pad relative to the thickness (H1) of each shoulder land portion was 0.33. A ratio of the width (W1A) of the pad relative to the width (W1) of each shoulder land portion was 0.50.

Example 7 to 10 and Comparative Example 10 to 11

Tires were each obtained so as to have the same structure and specifications as those for Example 6 except that the ratio (P1A/P1B) was as indicated below in Table 4.

Example 11 to 12 and Comparative Example 12 to 13

Tires were each obtained so as to have the same structure and specifications as those for Example 6 except that the ratio (BW/TW) was as indicated below in Table 5.

Example 13 to 14 and Comparative Example 14 to 15

Tires were each obtained so as to have the same structure and specifications as those for Example 6 except that the complex elastic modulus (E1A) of the pad, and the complex elastic modulus (E1B) of the body portion were as indicated below in Table 6.

Example 15 to 16 and Comparative Example 16 to 17

Tires were each obtained so as to have the same structure and specifications as those for Example 6 except that the loss tangent (L1A) of the pad, and the loss tangent (L1B) of the body portion were as indicated below in Table 7.

Example 17 to 20 and Comparative Example 18 to 19

Tires were each obtained so as to have the same structure and specifications as those for Example 6 except that the ratio (H1A/H1) was as indicated below in Table 8.

Example 21 to 24 and Comparative Example 20 to 21

Tires were each obtained so as to have the same structure and specifications as those for Example 6 except that the ratio (W1A/W1) was as indicated below in Table 9.

Generated State of Uneven Wear II

Test tires were each mounted to a high-speed bus. The size of a rim was 8.25×22.5. An internal pressure of each tire was adjusted to 800 kPa. The high-speed bus was caused to run 30000 km in a fully loaded state. After the running, a generated state of uneven wear (shoulder wear and triangular wear) in each tire mounted to a front wheel was observed. A width of the uneven wear was measured, and each tire was rated as below according to the measured width.

5: Less than 1 mm
4: Greater than or equal to 1 mm, and less than 4 mm
3: Greater than or equal to 4 mm, and less than 7 mm
2: Greater than or equal to 7 mm, and less than 10 mm
1: Greater than or equal to 10 mm The results are indicated below in Table 4 to Table 9. The greater the value is, the higher the evaluation is.

Fuel Consumption Performance

The fuel consumption performance was evaluated in the same manner as in Experiment A. The results are indicated below in Table 4 to Table 9.

TABLE 4

Evaluation Results

| | Comparative Example 10 | Example 7 | Example 8 | Example 9 | Example 10 | Comparative Example 11 |
|---|---|---|---|---|---|---|
| Ratio (P1A/P1B) | 0.80 | 0.85 | 0.87 | 0.93 | 0.95 | 0.98 |
| Ratio (BW/TW) | 0.98 | 0.98 | 0.98 | 0.98 | 0.98 | 0.98 |
| Complex Elastic Modulus E1A [MPa] | 5.60 | 5.60 | 5.60 | 5.60 | 5.60 | 5.60 |
| Complex Elastic Modulus E1B [MPa] | 5.20 | 5.20 | 5.20 | 5.20 | 5.20 | 5.20 |
| Loss Tangent L1A [—] | 0.115 | 0.115 | 0.115 | 0.115 | 0.115 | 0.115 |
| Loss Tangent L1B [—] | 0.075 | 0.075 | 0.075 | 0.075 | 0.075 | 0.075 |
| Ratio (H1A/H1) | 0.33 | 0.33 | 0.33 | 0.33 | 0.33 | 0.33 |
| Ratio (W1A/W1) | 0.50 | 0.50 | 0.50 | 0.50 | 0.50 | 0.50 |
| Generated State of Wear | Shoulder Wear | 5 | 5 | 5 | 5 | 4 | 3 |
| Uneven Wear | Triangular Wear | 3 | 4 | 5 | 5 | 5 | 5 |
| Fuel Consumption Performance | 100 | 100 | 100 | 100 | 100 | 100 |

TABLE 5

Evaluation Results

| | Comparative example 12 | Example 11 | Example 6 | Example 12 | Comparative example 13 |
|---|---|---|---|---|---|
| Ratio (P1A/P1B) | 0.90 | 0.90 | 0.90 | 0.90 | 0.90 |
| Ratio (BW/TW) | 0.90 | 0.95 | 0.98 | 1.00 | 1.05 |
| Complex elastic modulus E1A [MPa] | 5.60 | 5.60 | 5.60 | 5.60 | 5.60 |
| Complex elastic modulus E1B [MPa] | 5.20 | 5.20 | 5.20 | 5.20 | 5.20 |
| Loss tangent L1A [—] | 0.115 | 0.115 | 0.115 | 0.115 | 0.115 |
| Loss tangent L1B [—] | 0.075 | 0.075 | 0.075 | 0.075 | 0.075 |
| Ratio (H1A/H1) | 0.33 | 0.33 | 0.33 | 0.33 | 0.33 |
| Ratio (W1A/W1) | 0.50 | 0.50 | 0.50 | 0.50 | 0.50 |
| Generated state of uneven wear | Shoulder wear | 5 | 5 | 5 | 5 | 3 |
| | Triangular wear | 3 | 5 | 5 | 5 | 2 |
| Fuel consumption performance | 100 | 100 | 100 | 100 | 100 |

TABLE 6

Evaluation Results

| | Comparative Example 14 | Example 13 | Example 14 | Comparative Example 15 |
|---|---|---|---|---|
| Ratio (P1A/P1B) | 0.90 | 0.90 | 0.90 | 0.90 |
| Ratio (BW/TW) | 0.98 | 0.98 | 0.98 | 0.98 |
| Complex Elastic Modulus E1A [MPa] | 5.10 | 5.55 | 5.75 | 6.00 |
| Complex Elastic Modulus E1B [MPa] | 4.50 | 4.95 | 5.45 | 5.70 |
| Loss Tangent L1A [—] | 0.115 | 0.115 | 0.115 | 0.115 |
| Loss Tangent L1B [—] | 0.075 | 0.075 | 0.075 | 0.075 |
| Ratio (H1A/H1) | 0.33 | 0.33 | 0.33 | 0.33 |
| Ratio (W1A/W1) | 0.50 | 0.50 | 0.50 | 0.50 |
| Generated State of Uneven Wear | Shoulder Wear | 3 | 5 | 5 | 3 |
| | Triangular Wear | 3 | 5 | 5 | 3 |
| Fuel Consumption Performance | 95 | 100 | 100 | 90 |

TABLE 7

| | Evaluation Results | | | |
|---|---|---|---|---|
| | Comparative Example 16 | Example 15 | Example 16 | Comparative Example 17 |
| Ratio (P1A/P1B) | 0.90 | 0.90 | 0.90 | 0.90 |
| Ratio (BW/TW) | 0.98 | 0.98 | 0.98 | 0.98 |
| Complex Elastic Modulus E1A [MPa] | 5.60 | 5.60 | 5.60 | 5.60 |
| Complex Elastic Modulus E1B [MPa] | 5.20 | 5.20 | 5.20 | 5.20 |
| Loss Tangent L1A [—] | 0.060 | 0.108 | 0.122 | 0.150 |
| Loss Tangent L1B [—] | 0.030 | 0.068 | 0.082 | 0.110 |
| Ratio (H1A/H1) | 0.33 | 0.33 | 0.33 | 0.33 |
| Ratio (W1A/W1) | 0.50 | 0.50 | 0.50 | 0.50 |
| Generated State of Wear  Shoulder Wear | 3 | 5 | 5 | 3 |
| Uneven Wear  Triangular Wear | 3 | 5 | 5 | 3 |
| Fuel Consumption Performance | 100 | 100 | 100 | 95 |

TABLE 8

| | Evaluation Results | | | | | |
|---|---|---|---|---|---|---|
| | Comparative Example 18 | Example 17 | Example 18 | Example 19 | Example 20 | Comparative Example 19 |
| Ratio (P1A/P1B) | 0.90 | 0.90 | 0.90 | 0.90 | 0.90 | 0.90 |
| Ratio (BW/TW) | 0.98 | 0.98 | 0.98 | 0.98 | 0.98 | 0.98 |
| Complex Elastic Modulus E1A [MPa] | 5.60 | 5.60 | 5.60 | 5.60 | 5.60 | 5.60 |
| Complex Elastic Modulus E1B [MPa] | 5.20 | 5.20 | 5.20 | 5.20 | 5.20 | 5.20 |
| Loss Tangent L1A [—] | 0.115 | 0.115 | 0.115 | 0.115 | 0.115 | 0.115 |
| Loss Tangent L1B [—] | 0.075 | 0.075 | 0.075 | 0.075 | 0.075 | 0.075 |
| Ratio (H1A/H1) | 0.10 | 0.30 | 0.31 | 0.34 | 0.35 | 0.60 |
| Ratio (W1A/W1) | 0.50 | 0.50 | 0.50 | 0.50 | 0.50 | 0.50 |
| Generated State of Wear  Shoulder Wear | 3 | 4 | 5 | 5 | 5 | 4 |
| Uneven Wear  Triangular Wear | 3 | 4 | 5 | 5 | 5 | 3 |
| Fuel Consumption Performance | 100 | 100 | 100 | 100 | 98 | 90 |

TABLE 9

| | Evaluation Results | | | | | |
|---|---|---|---|---|---|---|
| | Comparative Example 20 | Example 21 | Example 22 | Example 23 | Example 24 | Comparative Example 21 |
| Ratio (P1A/P1B) | 0.90 | 0.90 | 0.90 | 0.90 | 0.90 | 0.90 |
| Ratio (BW/TW) | 0.98 | 0.98 | 0.98 | 0.98 | 0.98 | 0.98 |
| Complex Elastic Modulus E1A [MPa] | 5.60 | 5.60 | 5.60 | 5.60 | 5.60 | 5.60 |
| Complex Elastic Modulus E1B [MPa] | 5.20 | 5.20 | 5.20 | 5.20 | 5.20 | 5.20 |
| Loss Tangent L1A [—] | 0.115 | 0.115 | 0.115 | 0.115 | 0.115 | 0.115 |
| Loss Tangent L1B [—] | 0.075 | 0.075 | 0.075 | 0.075 | 0.075 | 0.075 |
| Ratio (H1A/H1) | 0.33 | 0.33 | 0.33 | 0.33 | 0.33 | 0.33 |
| Ratio (W1A/W1) | 0.25 | 0.35 | 0.45 | 0.55 | 0.58 | 0.65 |
| Generated State of Wear  Shoulder Wear | 3 | 4 | 5 | 5 | 5 | 3 |
| Uneven Wear  Triangular Wear | 3 | 5 | 5 | 5 | 5 | 4 |
| Fuel Consumption Performance | 100 | 100 | 100 | 100 | 98 | 90 |

As indicated in Table 4 to Table 9, evaluations for the tires of Examples are higher than evaluations for the tires of Comparative Examples. The evaluation results clearly indicate that the tires according to an embodiment of the present invention is superior.

The tire described above is applicable to various vehicles.

In the tire described in Japanese Laid-Open Patent Publication No. 2007-182099, an edge (hereinafter, referred to as a front edge) of each block on the front side in the rotation direction firstly comes into contact with a road surface during travelling. An edge (hereinafter, referred to as a rear edge) positioned behind the front edge comes into contact with the ground after the front edge has contacted with the ground.

In the shoulder land portion of the tire, an outer side portion, in the axial direction, of the front edge, i.e., a corner portion of each block is likely to significantly slip on the road surface after the front edge contacts with the ground and before the rear edge contacts with the ground. In this case, a roughly triangular wear mark may occur at the corner portion. Such wear is referred to as triangular wear.

As described above, each land portion of the tread may be formed of a rib that extends in the circumferential direction in some cases. In this case, a load is concentrated on an outer edge of the rib forming the shoulder land portion. In the tire, a ground-contact pressure is abnormally high at the outer edge of the rib. Therefore, when the rib is released from a ground-contacting state by the rotation, the outer edge of the rib may significantly slip on the road surface. Thus, the outer edge of the rib rubs, so that a stepped portion may be formed in the outer edge. Such wear is referred to as step wear.

In the heavy duty tire, although generation of the shoulder wear can be restrained by readjustment of the ground-contact shape, another problem arises that the triangular wear or the step wear may occur, so that generation of uneven wear cannot be sufficiently restrained.

A heavy duty pneumatic tire according to an embodiment of the present invention includes: a tread formed of a crosslinked rubber and having an outer surface that forms a tread surface; and a belt disposed inward of the tread in a radial direction. A ratio of a width of the belt to a width of the tread is greater than or equal to 0.95, and is not greater than 1.0. The tread has a base layer and a cap layer that is layered outward of the base layer in the radial direction. The tread has formed therein main grooves that extend in a circumferential direction, and thus has land portions aligned with each other in an axial direction. In shoulder land portions, among the land portions, which are positioned on outer sides in the axial direction, the cap layer has a body portion and a pad each of which has an outer surface that forms a portion of the tread surface. The body portion has a cut portion in an outer side portion in the axial direction. The pad is joined to the body portion at the cut portion. A ratio of a thickness of the pad to a thickness of each shoulder land portion is greater than or equal to 0.30, and is not greater than 0.35. A ratio of a width of the pad to a width of each shoulder land portion is greater than or equal to 0.30, and is not greater than 0.60. A complex elastic modulus of the pad is greater than a complex elastic modulus of the body portion. The complex elastic modulus of the body portion is greater than or equal to 4.95 MPa, and is not greater than 5.45 MPa. A loss tangent of the body portion is less than a loss tangent of the pad. The loss tangent of the pad is greater than or equal to 0.108, and is not greater than 0.122. When a ground-contact surface of each shoulder land portion in a state where the tire is in contact with a ground, is separated into an outer ground-contact surface and an inner ground-contact surface positioned inward of the outer ground-contact surface in the axial direction by a boundary between the body portion and the pad, a ratio of an average ground-contact pressure of the outer ground-contact surface relative to an average ground-contact pressure of the inner ground-contact surface is greater than or equal to 0.85, and is not greater than 0.95.

Preferably, in the heavy duty pneumatic tire, the complex elastic modulus of the pad is greater than or equal to 5.55 MPa, and is not greater than 5.75 MPa.

Preferably, in the heavy duty pneumatic tire, the loss tangent of the body portion is greater than or equal to 0.068, and is not greater than 0.082.

Preferably, in the heavy duty pneumatic tire, each land portion includes multiple blocks aligned with each other in the circumferential direction.

Preferably, in the heavy duty pneumatic tire, each land portion is formed of a rib that extends in the circumferential direction.

In the heavy duty pneumatic tire according to an embodiment of the present invention, land portions formed in the tread include shoulder land portions positioned on outer sides in the axial direction, and a ratio of an average ground-contact pressure of the outer ground-contact surface of each shoulder land portion relative to an average ground-contact pressure of the inner ground-contact surface of the shoulder land portion, is appropriately adjusted. In the tire, generation of shoulder wear and triangular wear (or step wear) is prevented. The tire is excellent in resistance to uneven wear. Further, in the tire, the cap layer in each shoulder land portion includes the body portion and the pad each of which has an outer surface that forms a portion of the tread surface. A complex elastic modulus of the pad is greater than a complex elastic modulus of the body portion. The pad can contribute to resistance to uneven wear. A loss tangent of the body portion is less than a loss tangent of the pad. The body portion can contribute to low fuel consumption performance. Further, the pad has an appropriate thickness and width, and therefore, in the tire, low fuel consumption performance and resistance to uneven wear are effectively enhanced. According to an embodiment of the present invention, both low fuel consumption performance and resistance to uneven wear can be achieved.

Obviously, numerous modifications and variations of the present invention are possible in light of the above teachings. It is therefore to be understood that within the scope of the appended claims, the invention may be practiced otherwise than as specifically described herein.

What is claimed is:

1. A heavy duty pneumatic tire, comprising:
a tread comprising a crosslinked rubber and having an outer surface forming a tread surface; and
a belt positioned inward of the tread in a radial direction such that a ratio of a width of the belt to a width of the tread is greater than or equal to 0.95 and is not greater than 1.0,
wherein the tread has a base layer and a cap layer formed outward of the base layer in the radial direction, the tread has a plurality of main grooves extending in a circumferential direction and a plurality of land portions aligned with each other in an axial direction, the plurality of land portions includes a plurality of shoulder land portions positioned on outer sides in the axial direction, the cap layer has a body portion and a pad, the pad is joined to a cut portion of the body portion formed in an outer side portion in the axial direction, a ratio of a thickness of the pad to a thickness of each of the shoulder land portions is greater than or equal to 0.30 and is not greater than 0.35, a ratio of a width of the pad to a width of each of the shoulder land portions is greater than or equal to 0.30 and is not greater than 0.60, the body portion has a complex elastic modulus which is greater than or equal to 4.95 MPa and is not greater than 5.45 MPa, the pad has a complex elastic modulus which is greater than the complex elastic modulus of the body portion, the pad has a loss tangent which is greater than or equal to 0.108 and is not greater than 0.122, the body portion has a loss tangent which is less than the loss tangent of the pad, each of the shoulder land portions has a ground-contact surface in a state where the tire is in contact with a ground, and the ground-contact surface of each of the shoulder land portions has an outer ground-contact surface and an inner ground-contact surface positioned inward of the outer ground-contact surface in the axial direction and separated by a boundary between the body portion and the pad such that a ratio of an average ground-contact pressure of the outer ground-contact surface relative to an average ground-contact pressure of the inner ground contact surface is greater than or equal to 0.85 and is not greater than 0.95.

2. The heavy duty pneumatic tire according to claim 1, wherein the complex elastic modulus of the pad is greater than or equal to 5.55 MPa and is not greater than 5.75 MPa.

3. The heavy duty pneumatic tire according to claim 2, wherein the loss tangent of the body portion is greater than or equal to 0.068 and is not greater than 0.082.

4. The heavy duty pneumatic tire according to claim 1, wherein the loss tangent of the body portion is greater than or equal to 0.068 and is not greater than 0.082.

5. The heavy duty pneumatic tire according to claim 1, wherein each of land portions includes a plurality of blocks aligned with each other in the circumferential direction.

6. The heavy duty pneumatic tire according to claim 1, wherein each of the land portions has a rib extending in the circumferential direction.

7. A heavy duty pneumatic tire, comprising:
a belt; and
a tread comprising a crosslinked rubber and formed on the belt such that a ratio of a width of the belt to a width of the tread is greater than or equal to 0.95 and is not greater than 1.0,
wherein the tread has a plurality of shoulder land portions positioned on outer sides in an axial direction, each of the shoulder land portions has a cap layer and is formed such that the cap layer has a body portion having a cut portion in an outer side portion in the axial direction and a pad formed in the cut portion of the body portion, the pad has a complex elastic modulus which is greater than a complex elastic modulus of the body portion, the body portion has a loss tangent which is less than a loss tangent of the pad, each of the shoulder land portions has a ground-contact surface having an outer ground-contact surface and an inner ground-contact surface positioned inward of the outer ground-contact surface in the axial direction and separated by a boundary between the body portion and the pad such that a ratio of an average ground-contact pressure of the outer ground-contact surface relative to an average ground-contact pressure of the inner ground contact surface is greater than or equal to 0.85 and is not greater than 0.95, a ratio of a thickness of the pad to a thickness of each of the shoulder land portions is greater than or equal to 0.30 and is not greater than 0.35, a ratio of a width of the pad to a width of each of the shoulder land portions is greater than or equal to 0.30 and is not greater than 0.60, the complex elastic modulus of the body portion is greater than or equal to 4.95 MPa and is not greater than 5.45 MPa, and the loss tangent of the pad is greater than or equal to 0.108 and is not greater than 0.122.

8. The heavy duty pneumatic tire according to claim 7, wherein the complex elastic modulus of the pad is greater than or equal to 5.55 MPa and is not greater than 5.75 MPa.

9. The heavy duty pneumatic tire according to claim 8, wherein the loss tangent of the body portion is greater than or equal to 0.068 and is not greater than 0.082.

10. The heavy duty pneumatic tire according to claim 7, wherein the loss tangent of the body portion is greater than or equal to 0.068 and is not greater than 0.082.

11. The heavy duty pneumatic tire according to claim 7, wherein each of the shoulder land portions includes a plurality of blocks aligned with each other in a circumferential direction.

12. The heavy duty pneumatic tire according to claim 7, wherein each of the shoulder land portions has a rib extending in a circumferential direction.

13. The heavy duty pneumatic tire according to claim 12, wherein each of the shoulder land portions has a rib extending in a circumferential direction.

14. A heavy duty pneumatic tire, comprising:
a belt; and
a tread comprising a crosslinked rubber and formed on the belt such that a ratio of a width of the belt to a width of the tread is greater than or equal to 0.95 and is not greater than 1.0,
wherein the tread has a plurality of shoulder land portions positioned on outer sides in an axial direction, each of the shoulder land portions has a cap layer and is formed such that the cap layer has a body portion having a cut portion in an outer side portion in the axial direction and a pad formed in the cut portion of the body portion, the pad has a complex elastic modulus which is greater than a complex elastic modulus of the body portion, the body portion has a loss tangent which is less than a loss tangent of the pad, each of the shoulder land portions has a ground-contact surface having an outer ground-contact surface and an inner ground-contact surface positioned inward of the outer ground-contact surface in the axial direction and separated by a boundary between the body portion and the pad such that a ratio of an average ground-contact pressure of the outer ground-contact surface relative to an average ground-contact pressure of the inner ground contact surface is greater than or equal to 0.85 and is not greater than 0.95, the complex elastic modulus of the body portion is greater than or equal to 4.95 MPa and is not greater than 5.45 MPa, and the loss tangent of the pad is greater than or equal to 0.108 and is not greater than 0.122.

15. The heavy duty pneumatic tire according to claim 14, wherein the complex elastic modulus of the pad is greater than or equal to 5.55 MPa and is not greater than 5.75 MPa.

16. The heavy duty pneumatic tire according to claim 15, wherein the loss tangent of the body portion is greater than or equal to 0.068 and is not greater than 0.082.

17. The heavy duty pneumatic tire according to claim 14, wherein the loss tangent of the body portion is greater than or equal to 0.068 and is not greater than 0.082.

18. The heavy duty pneumatic tire according to claim 14, wherein each of the shoulder land portions includes a plurality of blocks aligned with each other in a circumferential direction.

19. The heavy duty pneumatic tire according to claim 18, wherein each of the shoulder land portions has a rib extending in a circumferential direction.

20. The heavy duty pneumatic tire according to claim 14, wherein each of the shoulder land portions has a rib extending in a circumferential direction.

\* \* \* \* \*